United States Patent
Kjellnes et al.

(10) Patent No.: US 12,098,796 B2
(45) Date of Patent: Sep. 24, 2024

(54) SYSTEM FOR DEWATERING A FLOWLINE INCLUDING A MULTIPHASE PUMP CONNECTED AT A LOWER END OF THE FLOWLINE

(71) Applicant: ONESUBSEA IP UK LIMITED, London (GB)

(72) Inventors: Hans Fredrik Kjellnes, Nesttun (NO); Ina Ekeberg, Sandsli (NO); Svein-Arne Marthinussen, Sandsli (NO); Helge Dale, Raadal (NO); Knut Klepsvik, Sandsli (NO); Per Bloch Helmers, Sandsli (NO)

(73) Assignee: ONESUBSEA IP UK LIMITED, London (GB)

( * ) Notice: Subject to any disclaimer, the term of this patent is extended or adjusted under 35 U.S.C. 154(b) by 377 days.

(21) Appl. No.: 17/574,246

(22) Filed: Jan. 12, 2022

(65) Prior Publication Data

US 2022/0136636 A1 May 5, 2022

Related U.S. Application Data

(63) Continuation-in-part of application No. 17/366,312, filed on Jul. 2, 2021, now abandoned.

(Continued)

(51) Int. Cl.
*F16L 55/38* (2006.01)
*F04D 25/06* (2006.01)
(Continued)

(52) U.S. Cl.
CPC .......... *F16L 55/38* (2013.01); *F04D 25/0686* (2013.01); *F04D 31/00* (2013.01); *F17D 1/005* (2013.01); *F04D 13/086* (2013.01)

(58) Field of Classification Search
CPC ... F16L 55/38; F16L 55/46; F16L 1/26; F16L 55/26; F04D 25/0686; F04D 31/00;
(Continued)

(56) References Cited

U.S. PATENT DOCUMENTS 3,413,404 A  11/1968  Macfadyen et al.
4,185,704 A   1/1980  Nixon, Jr.
(Continued)

FOREIGN PATENT DOCUMENTS

AU       6318099 A     6/2001
CN     102701504 A    10/2012
(Continued)

OTHER PUBLICATIONS

Office Action issued in U.S. Appl. No. 17/171,305 dated Jul. 5, 2023, 12 pages.
(Continued)

*Primary Examiner* — Brandi N Hopkins
(74) *Attorney, Agent, or Firm* — Jeffrey D. Frantz

(57) ABSTRACT

A system for dewatering a subsea gas pipeline includes a pig launcher at the pipeline's upper end, which may be at or near the sea surface, and a pig receiver at the pipeline's lower end, which may be at or near the sea floor. A multiphase pump unit is deployed at the pipeline lower end and is configured to provide sea water suction to aid in a pig train being forced downwards through pipeline. The multiphase pump is configured to handle some amount of gas leaking around the pig train. A choke system may allow sea water to enter the flowline, thereby lowering the gas volume fraction (GVF) and preventing the GVF from exceeding the ability of the multiphase pump. For deeper water applications, a second pump may be provided in series that may be a single pump if positioned downstream of the multiphase pump.

19 Claims, 3 Drawing Sheets

Related U.S. Application Data

(60) Provisional application No. 63/047,592, filed on Jul. 2, 2020.

(51) Int. Cl.
  *F04D 31/00* (2006.01)
  *F17D 1/00* (2006.01)
  *F04D 13/08* (2006.01)

(58) Field of Classification Search
  CPC ........ F04D 13/086; F17D 1/005; E21B 43/13; E21B 43/36; E21B 37/00; B08B 9/055; B08B 9/55; G01F 1/44; B63C 11/42; B63C 11/52
  See application file for complete search history.

(56) References Cited

U.S. PATENT DOCUMENTS

| | | | |
|---|---|---|---|
| 4,198,191 | A | 4/1980 | Pierce |
| 6,109,372 | A | 8/2000 | Dorel et al. |
| 6,171,483 | B1 | 1/2001 | Eden et al. |
| 6,318,481 | B1 | 11/2001 | Schoeffler |
| 6,626,254 | B1 | 9/2003 | Krueger et al. |
| 7,569,097 | B2 | 8/2009 | Campen et al. |
| 7,731,843 | B2 | 6/2010 | Pinchin |
| 8,393,876 | B2 | 3/2013 | Sloteman et al. |
| 8,487,493 | B2 | 7/2013 | Cunningham et al. |
| 9,062,542 | B2 | 6/2015 | Sahni et al. |
| 9,206,819 | B2 | 12/2015 | Maier |
| 9,464,516 | B2 | 10/2016 | Ayirala et al. |
| 9,470,080 | B2 | 10/2016 | Kommepalli et al. |
| 9,583,988 | B2 | 2/2017 | Hansen et al. |
| 9,954,414 | B2 | 4/2018 | Cunningham et al. |
| 9,964,113 | B2 | 5/2018 | Westberg et al. |
| 10,160,662 | B2 | 12/2018 | Grimstad et al. |
| 10,370,272 | B2 * | 8/2019 | Knox-Holmes ... B01D 19/0005 |
| 10,859,084 | B2 | 12/2020 | Valland et al. |
| 2001/0011591 | A1 | 8/2001 | Van-Drentham Susman et al. |
| 2002/0088648 | A1 | 7/2002 | Krueger et al. |
| 2003/0145991 | A1 * | 8/2003 | Olsen ............. E21B 43/13 166/265 |
| 2005/0023222 | A1 | 2/2005 | Baillie |
| 2005/0029192 | A1 | 2/2005 | Arnold et al. |
| 2005/0112003 | A1 | 5/2005 | Jones et al. |
| 2006/0243670 | A1 | 11/2006 | Pinchin |
| 2007/0090039 | A1 | 4/2007 | Young et al. |
| 2009/0057223 | A1 | 3/2009 | Young et al. |
| 2009/0217992 | A1 | 9/2009 | Wilson |
| 2010/0129237 | A1 | 5/2010 | Eide et al. |
| 2011/0040485 | A1 | 2/2011 | Ong |
| 2011/0052432 | A1 | 3/2011 | Cunningham et al. |
| 2012/0107051 | A1 * | 5/2012 | Sweeney ............. F16L 1/26 367/141 |
| 2012/0205307 | A1 | 8/2012 | Boudinar |
| 2013/0195618 | A1 | 8/2013 | Kleynhans et al. |
| 2014/0205475 | A1 | 7/2014 | Dale |
| 2014/0241907 | A1 | 8/2014 | Grynning et al. |
| 2016/0304371 | A1 | 10/2016 | Wang et al. |
| 2016/0368800 | A1 | 12/2016 | Eriksen et al. |
| 2017/0261004 | A1 | 9/2017 | Hofstad et al. |
| 2017/0267545 | A1 | 9/2017 | Grimstad et al. |
| 2017/0298755 | A1 | 10/2017 | Mizukami |
| 2017/0306733 | A1 | 10/2017 | Reeves et al. |
| 2017/0306966 | A1 | 10/2017 | Valland et al. |
| 2018/0038388 | A1 | 2/2018 | Mizukami |
| 2018/0038515 | A1 | 2/2018 | Dixon |
| 2018/0216448 | A1 | 8/2018 | Bittencourt et al. |
| 2019/0169968 | A1 | 6/2019 | Kanstad et al. |
| 2020/0224519 | A1 | 7/2020 | Kleemeier et al. |
| 2022/0003091 | A1 | 1/2022 | Kjellnes et al. |
| 2022/0252070 | A1 | 8/2022 | Brunvold |
| 2022/0252071 | A1 | 8/2022 | Brunvold |

FOREIGN PATENT DOCUMENTS

| | | |
|---|---|---|
| EP | 0562147 A1 | 9/1993 |
| EP | 0594418 A1 | 4/1994 |
| EP | 0770760 A1 | 5/1997 |
| EP | 0877895 B1 | 4/2003 |
| EP | 986692 B1 | 1/2006 |
| EP | 3730795 A1 | 10/2020 |
| NO | 20150956 A1 | 1/2017 |
| WO | 9834003 A1 | 8/1998 |
| WO | 0028188 A1 | 5/2000 |
| WO | 2011053752 A1 | 5/2011 |
| WO | 2012121605 A1 | 9/2012 |
| WO | 2012163996 A2 | 12/2012 |
| WO | 2014206919 A1 | 12/2014 |
| WO | 2015103017 A1 | 7/2015 |
| WO | 2015123736 A1 | 8/2015 |
| WO | 2015138898 A1 | 9/2015 |
| WO | 2016189397 A1 | 12/2016 |
| WO | 2017013027 A1 | 1/2017 |
| WO | 2017157860 A1 | 9/2017 |
| WO | 2017186448 A1 | 11/2017 |
| WO | 2022155568 A1 | 7/2022 |

OTHER PUBLICATIONS

Stover et al., "Barrier Fluidless, Sealless Seawater Canned Motor Pumps", OTC-29473-MS, Offshore Technology Conference, May 2019, 11 pages.

International Search Report and Written Opinion dated Jun. 26, 2017 for International Application No. PCT/EP2017/055859.

Hermetic canned motor pumps acc. To API 685, Lederle Hermetic, available at: https://www.hermetic-pumpen.com/en/api-685, 3 pages.

Feldle, "Canned motor pumps in compliance with API 685—A contribution to environmental protection", Technical Report, Lederle Hermetic, 13 pages. Available at: https://www.hermetic-pumpen.com/_Resources/Persistent/8b2405ffbe4cfaeb9cb81470b3b8140800e34723/Fachbericht_Spaltrohrmotorpumpen_API_685_EN.pdf.

Office Action issued in U.S. Appl. No. 17/353,718 dated Apr. 26, 2023, 35 pages.

Office Action issued in U.S. Appl. No. 17/366,312 dated Jun. 8, 2022, 22 pages.

Office Action issued in U.S. Appl. No. 17/171,305 dated Jan. 17, 2023, 33 pages.

Search Report and Written Opinion issued in the PCT Application No. PCT/US2022/012667 dated Apr. 25, 2022, 11 pages.

International Preliminary Report on Patentability issued in the PCT Application No. PCT/US2022/015762 dated Aug. 24, 2023, 6 pages.

International Preliminary Report on Patentability issued in the PCT Application No. PCT/US2022/012667 dated Jul. 27, 2023, 8 pages.

Office Action issued in U.S. Appl. No. 17/171,305 dated Feb. 16, 2024, 18 pages.

Search Report and Written Opinion issued in International Patent Application No. PCT/US2022/015762 dated May 19, 2022, 10 pages.

* cited by examiner

SYSTEM FOR DEWATERING A FLOWLINE INCLUDING A MULTIPHASE PUMP CONNECTED AT A LOWER END OF THE FLOWLINE

CROSS-REFERENCE TO RELATED APPLICATIONS

This application is a continuation-in-part of co-pending U.S. patent application Ser. No. 17/366,312, filed Jul. 2, 2021, which claims benefit of U.S. Provisional Patent Application Ser. No. 63/047,592, filed Jul. 2, 2020. Each of the aforementioned related patent applications is herein incorporated by reference.

TECHNICAL FIELD

The present disclosure relates to dewatering flowlines. More particularly, the present disclosure relates to dewatering subsea flowlines such as gas flowlines prior to commissioning.

BACKGROUND

For subsea applications, hydrocarbon fluids such as oil and natural gas are obtained from a subterranean geologic formation, referred to as a reservoir, by drilling a well through a subsea wellhead system that penetrates the hydrocarbon-bearing geologic formation. In subsea applications, various types of infrastructure may be positioned along a sea floor and coupled by flow lines. The flow lines enable flow of production fluids, e.g., oil, gas, or other types of production fluids, from one subsea installation to another. Flow lines also may extend upwardly to various types of surface facilities, such as surface vessels or platforms.

Upon commissioning of a gas flowline, a known method to dewater is to insert a pipeline inspection gauge (referred to as a "pig") train in the far, or lower end of the water flooded flowline. A gas line from shoreside or vessel compression facility is connected to the lower of the flowline. Then compressed gas, typically nitrogen, is driving a pig train from subsea and back to shore, or alternatively, in the reverse direction. The gas pressure should be slightly higher than that of the ambient seawater pressure to drive the pig towards shore. For deepwater flowlines that can mean a requirement of 2-300 bars, which governs a requirement for an extensive compression plant due to the large pressure ratio. This process might be cumbersome, expensive and time consuming.

As the market for offshore gas is picking up, an increased amount of such flowlines is expected. Hence, the operators are looking for more efficient ways to execute this operation.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

According to some embodiments, a subsea fluid flowline dewatering system is described. The system includes: at least one multiphase pump positioned at lower end of a flowline to be dewatered; and a pig train configured to be introduced at an upper end of the flowline, the multiphase pump being configured to provide suction at the lower end of the flowline thereby supporting downward travel of the pig train towards the lower end of the pipeline. According to some embodiments, the fluid flowline is gas flowline.

According to some embodiments, the multiphase pump is configured to process fluids at least 10% gas volume fraction (GVF). According to some embodiments, the multiphase pump is configured to process fluids at least 30% gas volume fraction (GVF). According to some embodiments, the multiphase pump is configured to process fluids at least 50% gas volume fraction (GVF).

According to some embodiments, the system further includes a meter for density detection to estimate GVF, and a flow mixer unit positioned upstream of the meter. The mixer unit is configured to mix gas and liquid phases of fluid to enable adequate GVF estimations from the meter.

According to some embodiments, in applications where the lower end is greater than 1500 or 2000 meters below the upper end, a second pump positioned in series with and downstream of the multiphase pump. According to some embodiments, the second pump is a single phase pump configured to process fluids less than about 10% GVF.

According to some embodiments, the system also includes a controllable sea water inlet positioned up stream of the multiphase pump, the sea water inlet including a choke valve that is configured to allow additional sea water into the fluid entering the multiphase pump to ensure the GVF is not greater than the multiphase pump can adequately handle.

According to some embodiments, a method is also described to dewater a subsea gas flowline having an upper end and a lower end. The method includes launching a pig train at the upper end and pumping with a multiphase pump positioned at the lower end thereby supporting downward travel of the pig train towards the lower end.

BRIEF DESCRIPTION OF THE DRAWINGS

The subject disclosure is further described in the following detailed description, and the accompanying drawings and schematics of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
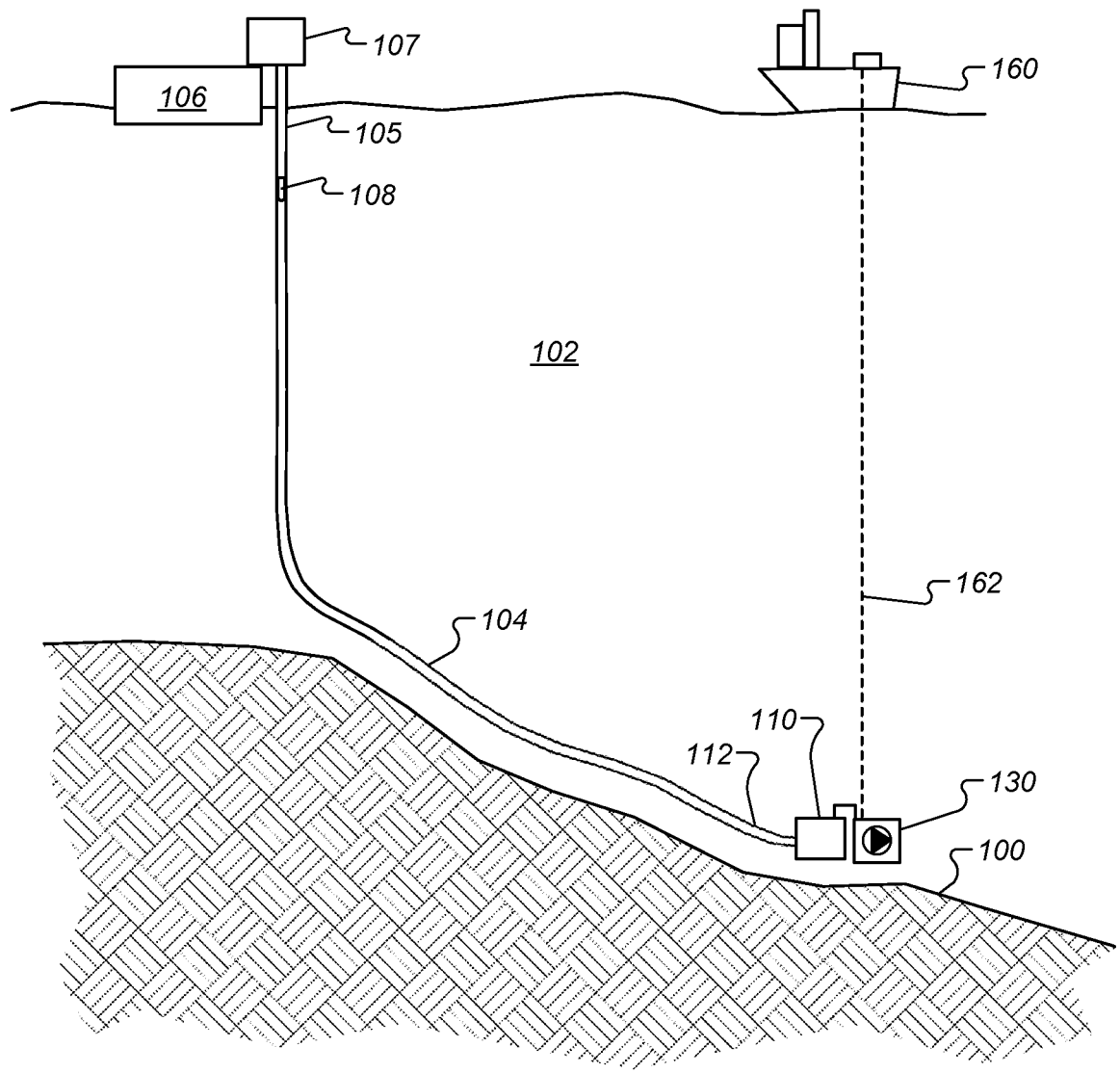
FIG. 1 is a diagram illustrating aspects of a flowline dewatering system, according to some embodiments.

One or more specific embodiments of the present disclosure will be described below. The particulars shown herein are by way of example, and for purposes of illustrative discussion of the embodiments of the subject disclosure only, and are presented in the cause of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice.

Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are used in an open-ended fashion, and thus should be interpreted to mean "including, but not limited to." Also, any use of any form of the terms "connect," "engage," "couple," "attach," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name, but not function.

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure and is not intended to limit the disclosure to that illustrated and described herein. It is to be fully recognized that the different teachings of the embodiments discussed below may be employed separately or in any suitable combination to produce desired results.

FIG. 1 is a diagram illustrating aspects of a flowline dewatering system, according to some embodiments. Subsea pipeline 104 is shown being commissioned in sea water 102 on sea floor 100. Pipeline 104 has pipeline upper end unit 107 at its upper end 105 and a pipeline lower end unit 110 at its lower end 112. According to some embodiments, the upper end unit 107 includes a pig launcher unit and may be mounted to a structure 106, which may be a platform, a vessel or other structure on or near the surface. According to some embodiments, pipeline lower end unit 110 includes a pig receiver unit and is on or near the seafloor 100. According to some embodiments, structure 106 may be a pipe laying vessel. To assist in the commissioning of a new pipeline a pig train 108 is launched from launcher unit 107 and travels through pipeline 104 assisted by suction from dewatering pump skid 130. According to some embodiments, pump skid 130 is deployed and powered by vessel 160 on the surface. According to some embodiments, pump skid 130 includes a multiphase pump.

Figure 2:
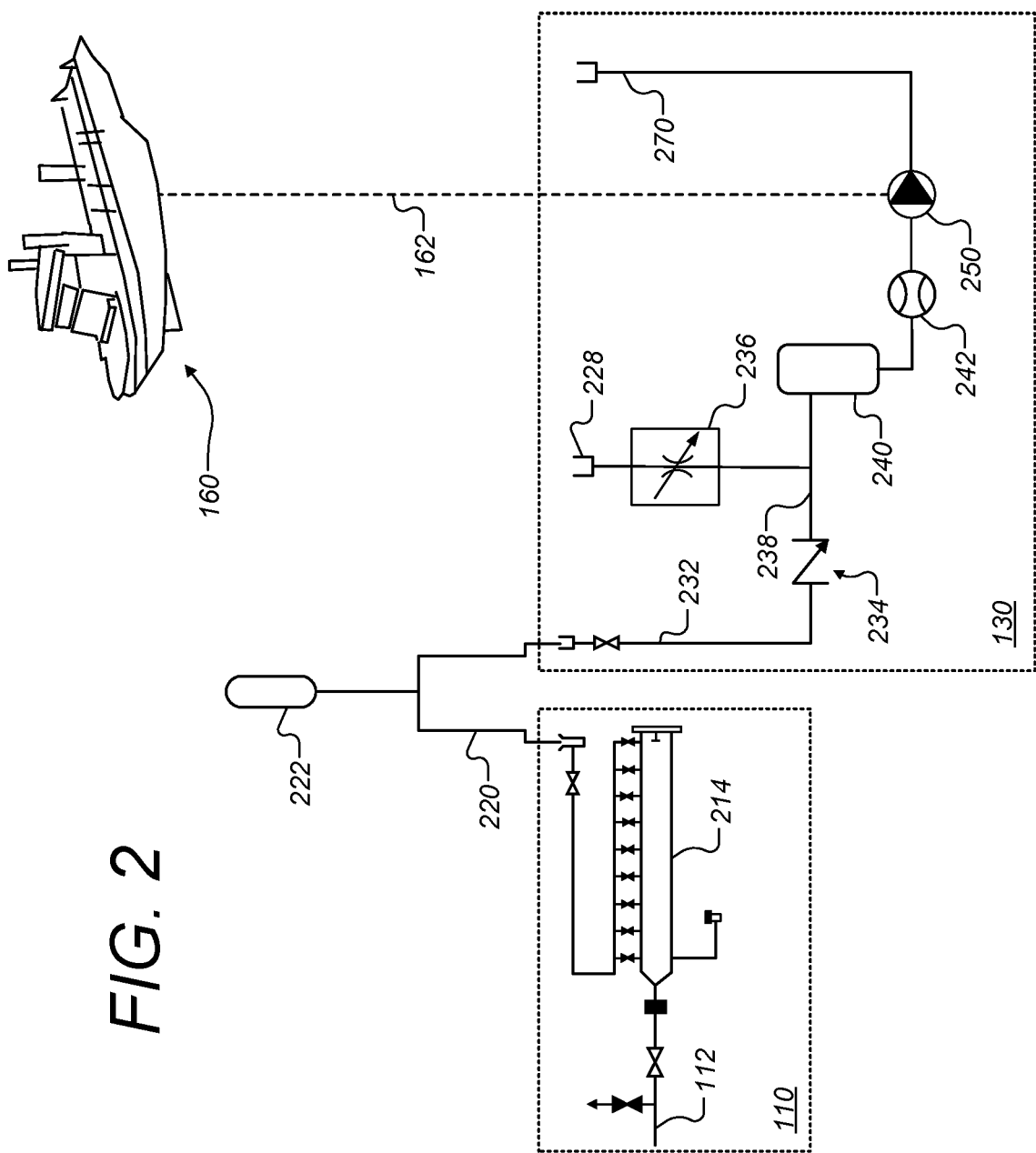
FIG. 2 is a diagram illustrating a flowline dewatering system according to some embodiments.
Figure 3:
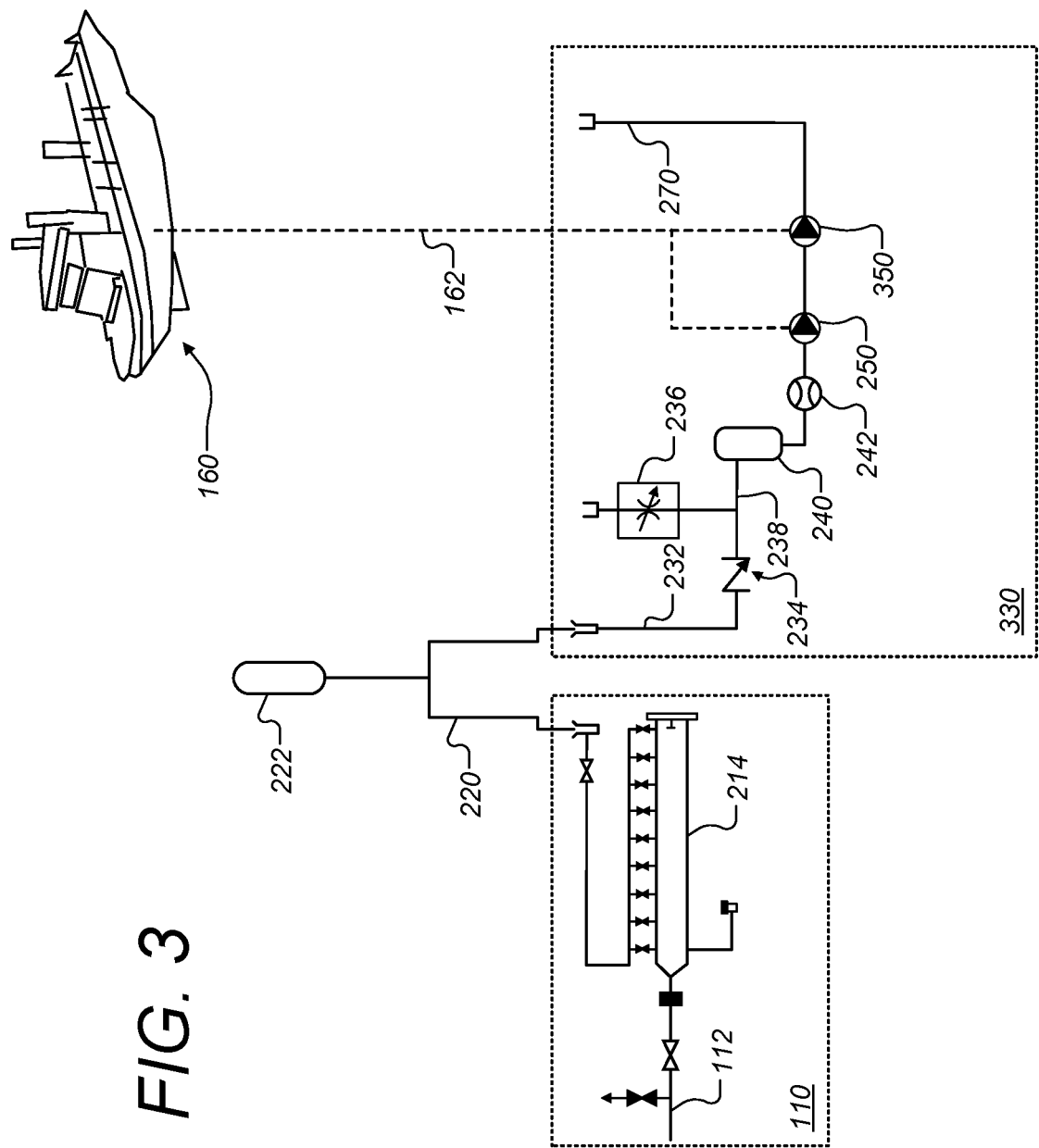
FIG. 3 is a diagram illustrating aspects of a flowline dewatering system according to some other embodiments.

FIG. 2 is a diagram illustrating a flowline dewatering system according to some embodiments. The embodiments shown may be particularly useful in medium water depth applications. A pump might be powered from vessel 160. Pipeline end unit 110 includes the end of pipeline 112 and pig receiver 214. The end unit 110 is the lower end of the gas flow line (104 shown in FIG. 1) to be commissioned that closest to the gas source. Also shown in FIG. 2 is flexible jumper spool 220 with optional buoyancy device 222. According to some embodiments, the optional buoyancy device 222 in FIGS. 2 and 3 is not implemented. The other end of jumper spool 220 is connected to inlet line 232 of dewatering pump skid 130. Multiphase pump 250 is started with a fully open sea water intake choke 236, which is configured to selectively draw sea water from sea water intake 228. As the desired speed is reached and the intake choke 236 is throttled down, the pump 250 will start to draw down pressure on the suction side (line 238). The inlet check valve 234 will crack open and the dewatering process starts. According to some embodiments dewatering skid is deployed from vessel 160, which is also used to supply electrical power to multiphase pump 250 via electrical cable 162. According to some embodiments, multiphase pump 250 is a subsea electric fluid processing machine such as described in co-pending U.S. patent application Ser. No. 17/171,305, filed Feb. 9, 2021, which is incorporated herein by reference. Water is discharged via sea water discharge line 270. According to some embodiments, the pumped water may be discharged either to sea or to a vessel through a downline (not shown).

As a certain amount of gas will leak across the pig train (not shown), some gas is to be expected to pass through the multiphase pump 250. According to some embodiments, flow mixer 240 and multiphase flowmeter 242 or another device for density detection is provided used to estimate Gas Volume Fraction (GVF). When the GVF exceeds the maximum acceptable for the pump, the intake choke 236 may be opened to let seawater into the suction side 238. Hence, the pump 250 will be able to generate a differential pressure enabling to dewater the flowline, even when high gas content is to be evacuated towards the end of the dewatering process. According to some embodiments, multiphase pump 250 is configured to handle GVF of up to about 30%. In such cases the choke 236 is used to ensure the GVF entering pump 250 is not greater than 30%. According to some embodiments, multiphase pump 250 may be configured to handle a different amount of maximum GVF. For example, according to some embodiments, pump 250 is configured to handle GFV of up to about 10%, and according to some other embodiments, pump 250 is configured to handle GFV of up to about 50%.

The system described is relatively compact compared to known systems and could be installed on a temporary structure. According to some embodiments, the dewatering might be a continuous operation with no need for cyclic operation to evacuate gas from separators. In contrast, systems that are configured with one or more single phase pumps instead of a multiphase pump, rely on one or more subsea separation units. With such arrangements, eventually the separator units will fill with water and the dewatering process needs to be interrupted while the water is removed from the separator(s). The systems as configured as shown herein will not need to be uninterrupted since such systems use a multiphase pump. Dewatering of flowlines using arrangements according to embodiments may be done with less topside compression power, more energy efficiency and potentially be faster and safer. The final gas pressure in the flowline will be lower as well, which will ease the subsequent de-pressurizing.

FIG. 3 is a diagram illustrating aspects of a flowline dewatering system according to some other embodiments. The embodiments shown may be particularly useful in high water depth applications. In this case, dewatering pump skid 330 includes both multiphase pump 250 and another multiphase pump 350 arranged in series. The configuration shown in FIG. 3 might be used to dewater a gas flowline from shore to the far end of said flowline where the pig train (not shown) is launched from topside, or shore, and might be supported by a gas pressure enabling suction conditions for the pumps 250 and 350.

According to some embodiments, pumps 250 and 350 are powered from a vessel 160 via cable 162. According to some embodiments, pumping is occurring at the differential pressures required when water depths exceed 1500 to 2000 meters, pump 350 is a booster stage, which is added to multiphase pump 250. The multiphase pump 250 will compress the associated gas and in some examples is configured to handle up to about 30% GVF, while the booster stage 350 is a single-phase pump that is configured to handle up to about 10% GVF. According to some embodiments, multiphase pumps 250 and 350 may be configured to handle different amounts of maximum GVF. For example, according to some embodiments, single-phase pump booster stage 350 may be of a design that can handle a maximum GVF lower than 10%.

According to some embodiments, pumps 250 and 350 are started with a fully open sea water intake choke 236. As the desired speed is reached and the intake choke 236 is throttled down, the pump will start to draw down pressure on the suction side 238. The inlet check valve 234 will crack open and the dewatering process starts.

As a certain amount of gas will leak across the pig train, some gas is to be expected through the pump 250. A multiphase flowmeter 242 or another device for density detection is used to estimate GVF. When the GVF exceeds the maximum acceptable for the pump 250, the intake choke 236 will start to let seawater into the suction side. Hence, the pump 350 will be able to generate a differential pressure to dewater the flowline, even when high gas content is to be evacuated towards the end of the dewatering process.

The above discussion is meant to be illustrative of the principles and various embodiments of the present disclosure. While certain embodiments have been shown and described, modifications thereof may be made by one skilled in the art without departing from the spirit and teachings of the disclosure. The embodiments described herein are exemplary only and are not limiting. Accordingly, the scope of protection is not limited by the description set out above, but is only limited by the claims that follow, that scope including all equivalents of the subject matter of the claims.

What is claimed is:

1. A subsea fluid flowline dewatering system, comprising:
at least one multiphase pump positioned at a lower end of a fluid flowline to be dewatered;
a multiphase flowmeter in communication with the fluid flowline and positioned on a suction side of the at least one multiphase pump;
a choke valve in fluid communication with the fluid flowline and positioned on the suction side of the at least one multiphase pump, the choke valve being selectively operated to allow seawater from an exterior of the fluid flowline to flow into the suction side of the at least one multiphase pump in response to a gas volume fraction (GVF) estimated by the multiphase flowmeter; and
a pig train configured to be introduced at an upper end of the fluid flowline, the at least one multiphase pump being configured to provide suction at the lower end of the fluid flowline, thereby supporting downward travel of the pig train towards the lower end of the fluid flowline.

2. The flowline dewatering system of claim 1, wherein the fluid flowline is a gas flowline.

3. The flowline dewatering system of claim 1, wherein the at least one multiphase pump is configured to process fluids at least 10% GVF, wherein the choke valve is operated to allow seawater to flow into the suction side of the at least one multiphase pump when the GVF estimated by the multiphase flowmeter exceeds 10% GVF.

4. The flowline dewatering system of claim 1, wherein the at least one multiphase pump is configured to process fluids at least 30% GVF.

5. The flowline dewatering system of claim 1, further comprising a flow mixer unit positioned upstream of the at least one multiphase flowmeter, the flow mixer unit configured to mix gas and liquid to facilitate GVF estimations by the at least one multiphase flowmeter.

6. The flowline dewatering system of claim 1, wherein the lower end of the fluid flowline is disposed less than about 1500 meters below the upper end.

7. The flowline dewatering system of claim 1, further comprising a second pump positioned in series with the at least one multiphase pump.

8. The flowline dewatering system of claim 7, wherein the second pump is a single phase pump configured to process fluids less than about 10% GVF.

9. The flowline dewatering system of claim 8, wherein the lower end of the fluid flowline is disposed greater than about 1500 meters below the upper end.

10. The flowline dewatering system of claim 1, wherein the choke valve is operated to allow seawater to flow into the suction side of the at least one multiphase pump when the GVF estimated by the multiphase flowmeter exceeds 10% GVF.

11. The flowline dewatering system of claim 1, wherein the choke valve is operated to allow seawater to flow into the suction side of the at least one multiphase pump when the GVF estimated by the multiphase flowmeter exceeds 30% GVF.

12. A method to dewater a subsea fluid flowline having an upper end and a lower end, the method comprising:
launching a pig train at the upper end;
pumping a fluid in the subsea fluid flowline out of the subsea fluid flowline with a multiphase pump positioned at the lower end, thereby supporting downward travel of the pig train towards the lower end; and
operating a choke valve to allow seawater from an exterior of the fluid flowline to flow into a suction side of the multiphase pump based on a gas volume fraction (GVF) of the fluid in the fluid flowline detected by a multiphase flowmeter.

13. The method of claim 12, wherein the subsea fluid flowline is a gas flowline.

14. The method of claim 12, wherein the subsea fluid flowline extends from shore to subsea.

15. The method of claim 12, wherein the multiphase pump is configured to process fluids at least 30% GVF.

16. The method of claim 12, further comprising mixing gas and liquid phases of the fluid in the subsea fluid flowline to facilitate adequate GVF estimations by the multiphase flowmeter.

17. The method of claim 12, wherein the lower end of the subsea fluid flowline is less than about 1500 meters below the upper end.

18. The method of claim 12, further comprising pumping the fluid with a single phase pump positioned in series and downstream of the multiphase pump.

19. The method of claim 18, wherein the single phase pump configured to process fluids less than about 10% GVF, wherein the choke valve is operated to allow seawater to flow into the suction side of the multiphase pump when the GVF estimated by the multiphase flowmeter exceeds 10% GVF.

* * * * *